US009742213B2

(12) United States Patent
Lee

(10) Patent No.: US 9,742,213 B2
(45) Date of Patent: Aug. 22, 2017

(54) WIRELESS CHARGING APPARATUS AND METHOD OF VEHICLE

(71) Applicant: Hyundai Motor Company, Seoul (KR)

(72) Inventor: Sang Min Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 199 days.

(21) Appl. No.: 14/714,901

(22) Filed: May 18, 2015

(65) Prior Publication Data

US 2017/0093195 A1 Mar. 30, 2017

(30) Foreign Application Priority Data

Oct. 20, 2014 (KR) ........................ 10-2014-0142094

(51) Int. Cl.
H04M 1/00 (2006.01)
H02J 7/02 (2016.01)
H02J 7/14 (2006.01)
H02J 50/60 (2016.01)
G08C 17/02 (2006.01)

(52) U.S. Cl.
CPC ............. *H02J 7/025* (2013.01); *G08C 17/02* (2013.01); *H02J 7/1461* (2013.01); *H02J 50/60* (2016.02); *G08C 2201/11* (2013.01)

(58) Field of Classification Search
None
See application file for complete search history.

(56) References Cited

U.S. PATENT DOCUMENTS

| 9,276,641 | B2 | 3/2016 | Hur et al. | |
|---|---|---|---|---|
| 2013/0110318 | A1 | 5/2013 | Colja et al. | |
| 2014/0217816 | A1* | 8/2014 | Okada | H02J 7/025 307/10.1 |
| 2015/0363988 | A1* | 12/2015 | Van Wiemeersch | H04M 1/11 455/557 |

FOREIGN PATENT DOCUMENTS

| KR | 10-2012-0124560 A | 11/2012 |
|---|---|---|
| KR | 2014-0025204 A | 3/2014 |
| KR | 2014-0082208 A | 7/2014 |
| KR | 2014-0085557 A | 7/2014 |
| KR | 10-2015-0131587 A | 11/2015 |

* cited by examiner

*Primary Examiner* — Mohammed Rachedine
(74) *Attorney, Agent, or Firm* — Mintz Levin Cohn Ferris Glovsky and Popeo, P.C.; Peter F. Corless

(57) ABSTRACT

A wireless charging apparatus includes: a receiver configured to receive a signal from a smart key apparatus indicating whether a smart key is present in the vehicle; a frequency controller configured to control a wireless charging frequency band when the receiver receives a signal indicating that the smart key is present in the vehicle; and an antenna configured to transmit a frequency controlled by the frequency controller.

13 Claims, 3 Drawing Sheets

WIRELESS CHARGING APPARATUS AND METHOD OF VEHICLE

CROSS-REFERENCE TO RELATED APPLICATION

This application claims priority to and the benefit of Korean Patent Application No. 10-2014-0142094, filed on Oct. 20, 2014 in the Korean Intellectual Property Office, the disclosure of which is incorporated herein in its entirety by reference.

TECHNICAL FIELD

The present disclosure relates generally to a wireless charging apparatus and method for a vehicle, and more particularly, to technology for preventing interference of electric waves between a smart key apparatus and a wireless charging apparatus.

BACKGROUND

Currently, information communication technologies are being rapidly developed, including technologies obtained by synthetically combining fields of electricity, electrons, communication, semiconductors, and the like. Moreover, as electronic devices have become increasingly mobile, research has been actively conducted into the wireless communication and wireless power transmission technologies. In particular, research has been actively conducted into methods for wirelessly supplying power to mobile electronic devices.

Wireless power transmission techniques wirelessly supply (i.e., transmit) power through a space typically using inductive coupling, capacitive coupling, or an electromagnetic field resonance structure (e.g., an antenna, etc.) without physical contact between a transmitter end for supplying power and an electronic device (i.e., a receiver end) for receiving power.

Conventionally, when power is supplied to a mobile device in a vehicle, such as a cellular phone, a headset, or the like, the power is supplied to the mobile device by putting a cigar jack connected to a cord a 12 V DC output port and connecting the cord to a receiving device. In this case, it can be cumbersome to connect a connection jack to the receiving device, and safety risks may arise if such a connection operation is performed while driving. In addition, since the connection jack and the receiving device are connected through the line, it can be difficult to process lines in the vehicle, causing an unsightly outer appearance when the cords are not organized.

In order to overcome problems due to wired charging techniques, wireless power transmission techniques have been proposed. However, in this regard, problems have arisen due interference of electric waves with an apparatus or system using wireless power in a vehicle. Thus, malfunctions can occur in a wireless charging apparatus or system.

SUMMARY

The present disclosure has been made to solve the above-mentioned problems occurring in the related art while advantages achieved by the related art are maintained intact.

An aspect of the present disclosure provides a wireless charging apparatus and method for a vehicle, which prevents electric wave interference between a smart key apparatus and a wireless charging apparatus during operations of the smart key apparatus and the wireless charging apparatus. Further, the wireless charging apparatus and method simultaneously transmits an operation of the smart key apparatus to the wireless charging apparatus and changes a frequency used by the wireless charging apparatus.

According to embodiments of the present disclosure, a wireless charging apparatus for a vehicle includes: a receiver configured to receive a signal from a smart key apparatus indicating whether a smart key is present in the vehicle; a frequency controller configured to control a wireless charging frequency band when the receiver receives a signal indicating that the smart key is present in the vehicle; and an antenna configured to transmit a frequency controlled by the frequency controller.

The frequency controller may be further configured to change the wireless charging frequency band to 200 kHz or more when the receiver receives the signal indicating that the smart key is present in the vehicle.

The wireless charging frequency band may be changed back to a frequency in a range of 105 kHz to 115 kHz when the receiver subsequently receives a signal indicating that the smart key is not present in the vehicle.

The frequency controller may be further configured to change the wireless charging frequency band to a frequency in a range of 105 kHz to 115 kHz when the receiver receives a signal indicating that the smart key is not present in the vehicle.

The antenna may be further configured to transmit electric waves of a low frequency band and charge a battery of a cellular phone disposed adjacent to the antenna.

The smart key apparatus may include a smart key antenna, the smart key, and a smart key controller.

Furthermore, according to embodiments of the present disclosure, a wireless charging method for a vehicle includes: receiving a signal from a smart key apparatus indicating whether a smart key is present in the vehicle; controlling a wireless charging frequency band upon receiving a signal indicating that the smart key is present in the vehicle, and transmitting the controlled frequency.

The wireless charging method may further include changing the wireless charging frequency band to 200 kHz or more upon receiving the signal indicating that the smart key is present in the vehicle.

The wireless charging method may further include changing the wireless charging frequency band back to a frequency in a range from 105 kHz to 115 kHz upon subsequently receiving a signal indicating that the smart key is not present in the vehicle.

The wireless charging method may further include changing the wireless charging frequency band to a frequency in a range from 105 kHz to 115 kHz upon receiving a signal indicating that the smart key is not present in the vehicle.

The transmitting of the controlled frequency may further include charging a battery of a cellular phone disposed adjacent to an antenna of the vehicle by transmitting electric waves of a low frequency band.

The smart key apparatus may include a smart key antenna, the smart key, and a smart key controller.

Furthermore, according to embodiments of the present disclosure, a non-transitory computer readable medium containing program instructions for performing a wireless charging method for a vehicle includes: program instructions that control a wireless charging frequency band based on receipt of a signal indicating whether a smart key is present in the vehicle, such that the wireless charging frequency band is changed to 200 kHz or more upon receiving a signal indicating that the smart key is present in the vehicle, and the wireless charging frequency band is changed to a frequency in a range from 105 kHz to 115 kHz upon receiving a signal indicating that the smart key is not present in the vehicle. The changed frequency is then transmitted.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
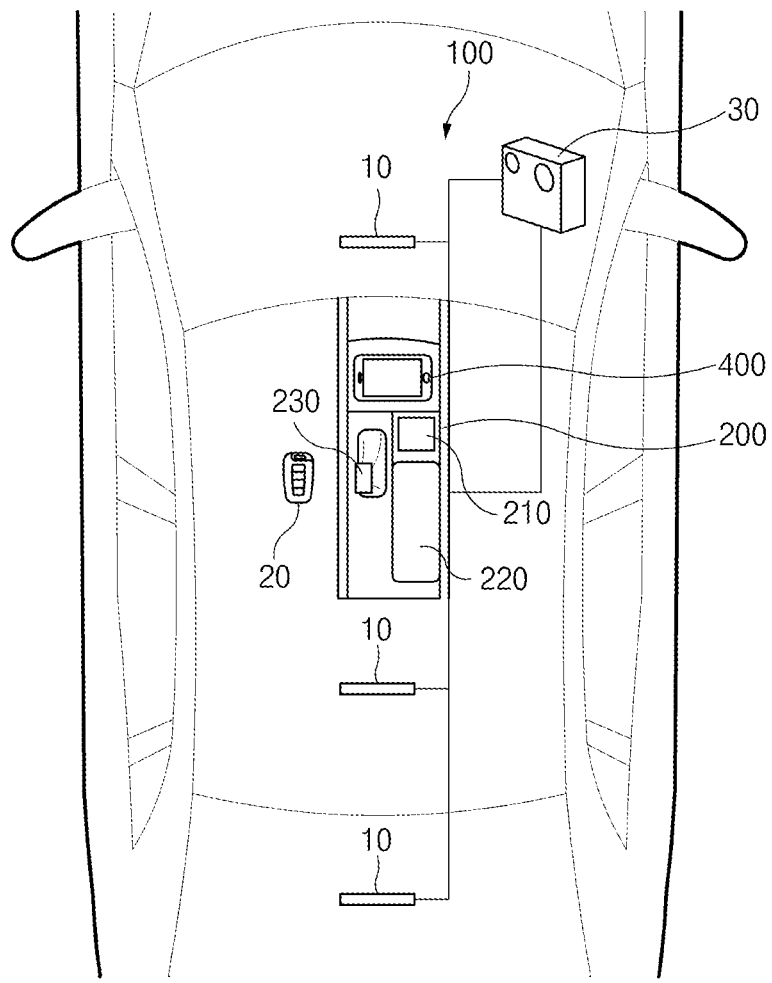
FIG. 1 is a diagram for explanation of configuration of a smart key apparatus and a wireless charging apparatus according to embodiments of the present disclosure.

Embodiments will now be described more fully with reference to the accompanying drawings to clarify aspects, features and advantages of the present disclosure so as for those of ordinary skill in the art to easily implement with reference to the accompanying drawings. In the following description of the present disclosure, a detailed description of known functions and configurations incorporated herein will be omitted when it may make the subject matter of the present disclosure unclear. The present disclosure will now be described more fully with reference to the accompanying drawings, in which embodiments of the present disclosure are shown.

The terminology used herein is for the purpose of describing particular embodiments only and is not intended to be limiting of the disclosure. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, FIG. 1 is a diagram for explanation of configuration of a smart key apparatus 100 and a wireless charging apparatus 200 according to embodiments of the present disclosure.

As shown in FIG. 1, the smart key apparatus 100 may include a smart key antenna 10, a smart key (Fob) 20, and a smart key controller 30. The smart key antenna 10 may be installed in a vehicle. A plurality of smart key antennas may be disposed at various positions according to a vehicle type. The smart key antenna 10 may be mainly disposed in a crush pad (C/PAD) inside the vehicle, a central console between a passenger's seat and driver's seat of the vehicle, or a trunk. The smart key antenna 10 emits electric waves of a low frequency band. The low frequency band may be about 125 kHz. In particular, an LF antenna emitting electric waves of a low frequency band among smart key antennas may be connected to the smart key controller 30.

The smart key 20 receives electric waves transmitted from the smart key antenna 10 and checks whether the smart key 20 is a smart key system registered in the vehicle from the received electric waves. Upon recognizing that the corresponding smart key 20 is the smart key system registered in the vehicle, the smart key 20 may transmit elective waves of a high frequency band to the smart key controller 30 and indicate that the smart key 20 is present in the vehicle.

The smart key controller 30 receives electric waves transmitted from the smart key 20 and transmits a signal indicating that the smart key 20 is present in the vehicle to the wireless charging apparatus 200. Here, whether the smart key 20 is present in the vehicle may be indicated using a wired signal including wired communication or a wired wire, or a radio signal including radio communication.

The wireless charging apparatus 200 may include a structure for charging a cellular phone 400 inside the vehicle and may be disposed in the vehicle and may be mainly configured to mount or fix the cellular phone 400 around a central console of the vehicle. When the cellular phone 400 in the vehicle is mounted on the wireless charging apparatus 200, the wireless charging apparatus 200 may automatically recognize or charge the cellular phone 400 or the cellular phone 400 may be recognized or charged by pushing an operation button of the wireless charging apparatus 200 by a driver. When an antenna 230 (i.e., charging coil) disposed in the wireless charging apparatus 200 and an antenna 230 (i.e., charging coil) in the cellular phone 400 are disposed adjacent to each other, the antenna 230 in the wireless charging apparatus 200 transmits electric waves of a low frequency band to the antenna 230 in the cellular phone 400.

Then, the antenna 230 in the cellular phone 400 disposed adjacent to the wireless charging apparatus 200 induces electromotive force and charges a battery of the cellular phone 400. The low frequency band may be 105 kHz to 115 kHz.

Figure 2:
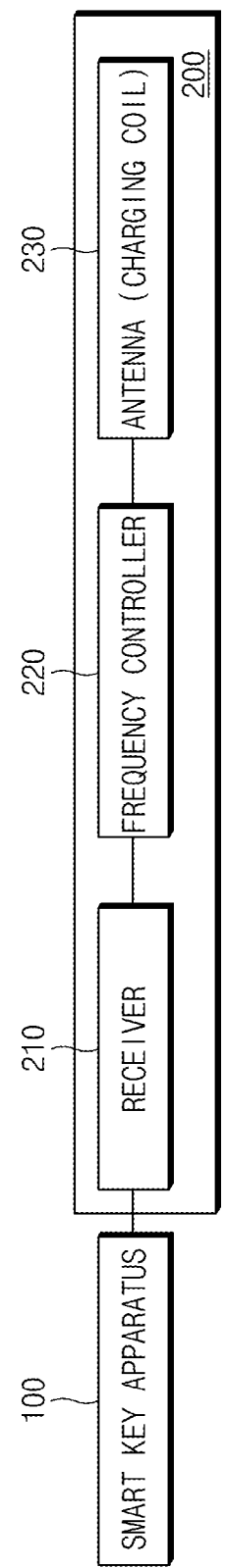
FIG. 2 is a block diagram for detailed explanation of a wireless charging apparatus of a vehicle according to embodiments of the present disclosure.

FIG. 2 is a block diagram for detailed explanation of the wireless charging apparatus 200 of a vehicle according to embodiments of the present disclosure.

As shown in FIG. 2, the wireless charging apparatus 200 includes a receiver 210, a frequency controller 220, and an antenna 230. The receiver 210 receives a radio signal indicating that the smart key 20 is present in the vehicle from the smart key controller 30.

Upon receiving the signal indicating that the smart key 20 is present in the vehicle by the receiver 210, the frequency controller 220 may change a wireless charging frequency band to 200 kHz or more. Upon receiving a signal indicating that the smart key 20 is not present in the vehicle, frequency controller 220 may control a wireless charging frequency band back to 105 kHz to 115 kHz. That is, the frequency controller 220 may change a frequency band. The antenna 230 may transmit low frequency band electric waves controlled from the frequency controller 220 or transmit a wireless charging frequency band changed to 200 kHz or more according to the signal received from the smart key controller 30.

Figure 3:
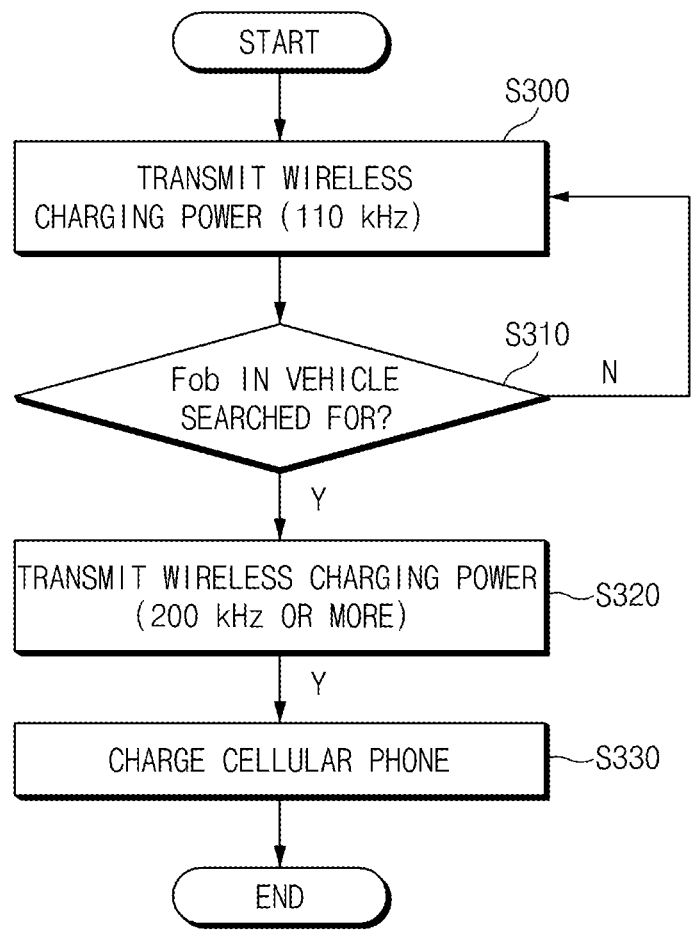
FIG. 3 is a flowchart for explanation of an operating method of a wireless charging apparatus of a vehicle according to embodiments of the present disclosure.

FIG. 3 is a flowchart for explanation of an operating method of a wireless charging apparatus of a vehicle according to embodiments of the present disclosure.

As shown in FIG. 3, the operating method of the wireless charging apparatus from a radio signal received from a smart key apparatus will be described in detail. First, an antenna (i.e., charging coil) installed in the wireless charging apparatus transmits electric waves of a low frequency band of 105 kHz to 115 kHz and induces electromotive force in an antenna (i.e., charging coil) installed in a cellular phone to charge a battery of the cellular phone (S300).

Then, a smart key controller of a smart key apparatus determines a signal about whether a smart key is present in the vehicle is received (S310).

In addition, upon receiving a radio signal indicating that the smart key is present in the vehicle, from the smart key apparatus through a receiver of the wireless charging apparatus, the antenna installed in the wireless charging apparatus transmits a wireless charging frequency band changed to 200 kHz or more (S320).

Then electromotive force is induced in the antenna in the cellular phone to charge a battery of the cellular phone (S330).

As described above, the techniques disclosed herein may prevent electric wave interference that may occur during wireless charging in the vehicle and an operation of the smart key, thereby preventing malfunction of various wirelessly operating systems in the vehicle. In addition, the disclosed techniques may achieve continuous wireless charging without suspension of wireless charging in the vehicle and without operation of the smart key during the wireless charging in the vehicle.

While the present disclosure has been particularly shown and described with reference to embodiments and drawings thereof, it will be understood by those of ordinary skill in the art that various changes in form and details may be made therein without departing from the spirit and scope of the present disclosure as defined by the following claims.

What is claimed is:

1. A wireless charging apparatus for a vehicle, comprising:
    a receiver configured to receive a signal from a smart key apparatus indicating whether the smart key is present in the vehicle;
    a frequency controller configured to control a wireless charging frequency band when the receiver receives a signal indicating that the smart key is present in the vehicle and to change the wireless charging frequency band to a frequency in a range set according to whether the smart key is present in the vehicle or not present in the vehicle; and
    an antenna configured to transmit a frequency controlled by the frequency controller.

2. The wireless charging apparatus according to claim 1, wherein the frequency controller is further configured to change the wireless charging frequency band to 200 kHz or more when the receiver receives the signal indicating that the smart key is present in the vehicle.

3. The wireless charging apparatus according to claim 2, wherein the wireless charging frequency band is changed back to a frequency in a range of 105 kHz to 115 kHz when the receiver subsequently receives a signal indicating that the smart key is not present in the vehicle.

4. The wireless charging apparatus according to claim 1, wherein the frequency controller is further configured to change the wireless charging frequency band to a frequency in a range of 105 kHz to 115 kHz when the receiver receives a signal indicating that the smart key is not present in the vehicle.

5. The wireless charging apparatus according to claim 1, wherein the antenna is further configured to transmit electric waves of a low frequency band and charge a battery of a cellular phone disposed adjacent to the antenna.

6. The wireless charging apparatus according to claim 1, wherein the smart key apparatus includes a smart key antenna, the smart key, and a smart key controller.

7. A wireless charging method for a vehicle, the wireless charging method comprising:
    receiving a signal from a smart key apparatus indicating whether a smart key is present in the vehicle;
    controlling a wireless charging frequency band upon receiving a signal indicating that the smart key is present in the vehicle;
    changing the wireless charging frequency band to a frequency in a range set according to whether the smart key is present in the vehicle or not present in the vehicle; and
    transmitting the controlled frequency.

8. The wireless charging method according to claim 7, further comprising changing the wireless charging frequency band to 200 kHz or more upon receiving the signal indicating that the smart key is present in the vehicle.

9. The wireless charging method according to claim 8, further comprising changing the wireless charging frequency band back to a frequency in a range from 105 kHz to 115 kHz upon subsequently receiving a signal indicating that the smart key is not present in the vehicle.

10. The wireless charging method according to claim 7, further comprising changing the wireless charging frequency band to a frequency in a range from 105 kHz to 115 kHz upon receiving a signal indicating that the smart key is not present in the vehicle.

11. The wireless charging method according to claim 7, wherein the transmitting of the controlled frequency comprises charging a battery of a cellular phone disposed adjacent to an antenna of the vehicle by transmitting electric waves of a low frequency band.

12. The wireless charging method according to claim 7, wherein the smart key apparatus includes a smart key antenna, the smart key, and a smart key controller.

13. A non-transitory computer readable medium containing program instructions for performing a wireless charging method for a vehicle, the computer readable medium comprising:
  program instructions that control a wireless charging frequency band based on receipt of a signal indicating whether a smart key is present in the vehicle, such that the wireless charging frequency band is changed to 200 kHz or more upon receiving a signal indicating that the smart key is present in the vehicle, and the wireless charging frequency band is changed to a frequency in a range from 105 kHz to 115 kHz upon receiving a signal indicating that the smart key is not present in the vehicle, wherein the changed frequency is transmitted.

* * * * *